United States Patent
Hansel et al.

(10) Patent No.: US 7,136,504 B2
(45) Date of Patent: Nov. 14, 2006

(54) SYSTEM FOR PROCESSING POSTAL ITEMS

(76) Inventors: Karl-Günther Hansel, Buchenbergweg 4, D-78464, Konstanz (DE); Walter Rosenbaum, 5, rue Eugène Labiche, F-75116, Paris (FR)

( * ) Notice: Subject to any disclaimer, the term of this patent is extended or adjusted under 35 U.S.C. 154(b) by 0 days.

(21) Appl. No.: 10/756,474

(22) Filed: Jan. 14, 2004

(65) Prior Publication Data

US 2004/0146181 A1    Jul. 29, 2004

Related U.S. Application Data

(62) Division of application No. 09/202,759, filed as application No. PCT/EP97/02167 on Apr. 26, 1997, now Pat. No. 6,909,789.

(30) Foreign Application Priority Data

Jun. 22, 1996 (DE) ................ 196 24 977

(51) Int. Cl.
*G06K 9/00* (2006.01)

(52) U.S. Cl. ............... 382/101; 382/321; 209/584; 358/496

(58) Field of Classification Search ........... 382/100, 382/101, 102, 106, 108, 113, 140, 141, 165, 382/175, 179, 180, 181, 187, 189, 193, 196, 382/200, 209, 220, 231, 232, 235, 236, 237, 382/290, 309, 310, 311, 321; 235/454, 462.1; 209/546, 509, 900, 584, 3.3; 361/683; 348/116, 348/333.8; 358/474, 498, 496; 345/689, 345/32; 704/2; 705/8

See application file for complete search history.

(56) References Cited

U.S. PATENT DOCUMENTS

| | | | | | |
|---|---|---|---|---|---|
| 4,992,649 | A | * | 2/1991 | Mampe et al. | 209/546 |
| 5,031,223 | A | * | 7/1991 | Rosenbaum et al. | 382/101 |
| 5,249,687 | A | * | 10/1993 | Rosenbaum et al. | 209/3.3 |
| 5,287,271 | A | * | 2/1994 | Rosenbaum | 705/8 |
| 5,497,319 | A | * | 3/1996 | Chong et al. | 704/2 |
| 5,538,138 | A | * | 7/1996 | Reich | 209/3.3 |
| 5,966,457 | A | * | 10/1999 | Lemelson | 382/141 |

* cited by examiner

*Primary Examiner*—Daniel Miriam
*Assistant Examiner*—Seyed Azarian
(74) *Attorney, Agent, or Firm*—Siemens AG; Jacob Eisenberg

(57) ABSTRACT

The present invention relates to a method of processing postal matters in an automatic address-reading system, an image of the surface of each article of mail having address information being obtained and delivered to a first automatic evaluation system, and incorporately evaluated address information being delivered for evaluation to a first video coding system. It is provided that the address information of those images which have not been completely evaluated in the video coding system are delivered, using the results of the video coding system to another automatic evaluation system.

22 Claims, 3 Drawing Sheets

SYSTEM FOR PROCESSING POSTAL ITEMS

CROSS REFERENCE TO RELATED APPLICATIONS

The present application is a divisional application of U.S. patent application Ser. No. 09/202,759, filed Mar. 11, 2001 now U.S. Pat. No. 6,909,798 which is a national satge of PCT/EP97/02167, filed Apr. 26, 1997. herein incorporated by reference.

BACKGROUND OF THE INVENTION

The invention relates to automatic letter processing and particular to systems, for which an automatic address reading method is supplemented and improved by the use of video coding. Automatic address reading systems (OCR) are well known in the field of letter processing and are described, for example, in German Patent DE 195 31 392. Modern OCR letter sorting systems can achieve letter processing rates of 10 letters per second, meaning 36,000 letters per hour and more. However, the recognition reliability varies considerably, depending upon the lettering style and total quality of the address information affixed to the letter surface. In case of successful recognition, the respective letter can be provided with a machine-readable bar code. This bar code permits a further mechanical processing up to a desired, optional sorting order. In particular, the use of bar codes permits a sorting of letters of up the sorting level of the postal run; for which the letters are sorted according to the distribution sequence used by the delivery person.

Owing to the fact that the recognition rates for automatic reading systems vary considerably, it is necessary to support automatic necessary processes through various forms of manual intervention. The simplest intervention is that of rejection letters not readable in automatic reading systems and using a hand sorting process on them. However, the resulting expenses are uneconomically high, given the increase in operational expenses. Added to this is the fact that a mechanical sorting of such postal goods is not possible without problems at a later point in time, for example, two separate flows of goods are created, which must then be combined again manually at a letter and specific point in time.

In order to avoid these disadvantages resulting from the manual sorting of OCR rejected items, various methods have been developed for manually coding postal goods. These methods use operator intervention to affix bar codes to the items in a manner that is consistent with the requirement to carry out a mechanical sorting with the same machines that process OCR-read and bar-coded mail.

Another method for coding rejected postal items uses manual or a manually operated coding stations. At these manually-operator, wherein the operator encodes enough information from each of these items, as is necessary to clearly identify the destination. For this, the input address is converted by means of a directory to a sorting bar code which is then affixed to the item. The coded items are subsequently processed further by means of bar code sorter (BCS), which are identical to OCR-suitable BCS. Manually operated coding stations of this type were first introduced by the US Post Office and Royal Mail during the 1970's. The main disadvantages of these types of systems are the necessity to remove items from the OCR flow of items and the ergonomic difficulties experienced by the operator when identifying items transported past the operator.

The next progressive step in the treatment of OCR-rejected items was the item development of an on-line video coding systems (OVS). In an OVS, a video image of the item is presented to the operator for coding in place of the physical items are held in delay loops. In these delay loops, the items are normally held in motion for an interval that is sufficient for the OVS operator to input the necessary sorting information for the respective image. The standard delay loop, the higher the costs as well as the requirements for maintenance and the physical size of the facility.

The main problem when using an OVS is that the available time is only sufficient for a careful input of the zip code (zip) or the postal code (pc), unless delay loops with an impractical length are used.

For this reason, special coding methods were developed to keep the on-line delay time as low as possible.

In order to increase the coding productivity and/ore permit the listing of all address elements, meaning the zip code/postal code, street/post office box, addressee/post office box, addressee/firm, various state-of-the art methods have been developed. Essentially, these include:

Preview Coding

The preview coding involves a simultaneous displays of images from two items, one above the other. In this case, the lower image is the active one, meaning its data is to be encoded first before encoding attention is paid to the upper image. Following a suitable training, an encoding operators can encode information present on the lower image while at the same time recording the address information from the upper image. The upper image subsequently becomes active and the process is continued accordingly. The preview recording permits a doubling of the operator productivity through a complete overlapping of the cognitive and the motorized functions during the coding of successive images.

Extraction Coding

Since only the zip postal code address elements can be input reliably by the operator, given the on-line delay times that are possible in practical operations, specific key components of the address components referring to the street are input during extraction code. The extraction coding normally is based on specially developed rules, for which a code window length is used as an access key to an address directory. For example, the Royal Mail uses an extraction formula that is based in the first three and the last two letters. In that case, the operator must memorize special rules to avoid superfluous address on formation and must take into account specific, differentiating characteristics, e.g. directions such as east, west ore categories such as long as street, lane, road.

Despite a certain effectiveness, the extraction coding has several considerable disadvantages. In particular, it has complex extraction rules, which frequently require taking into account the end of a street name, an address component which is normally written with the least amount of clarity. The extraction coding also involves a significantly high rate of extraction that are not clear and to which several entries in a dictionary correspond. Accordingly, a clear sorting decision cannot always be made. Furthermore, it must be taken into account that the input productivity of the operators is reduced as soon as the operator must make a decisions rather than perform a simpler task such as repetitive keyboard entry.

Completion Coding

In contrast to extraction coding, a variable input is made for the completion coding of each address directory, until both clearly coincide. An acceleration effect is achieved by displaying the remainder of the address as soon as it is recognized from within the directory. However, with this technology problems occur in that an input stop signal must be transmitted to the operator and illustration of the identified remainder of the address is necessary. As a result a reduced input productivity occurs and preview coding is prevented.

Operator-Assisted OCR Technology

The US Postal Service has experimented with operator-assisted OCR techniques to increase the address information to be processed on-line. In this case, the portion of the address image, for which the OCR identification has failed, is emphasized so as to increase effectiveness. Since the operators are slow when deciphering missing letters and since in part complex identification errors, (e.g. segmentation problems) occur as well, the operator productivity with this method is frequently lower than with a simple re-entering of the respective address.

Off-Line Coding

Since a sufficiently high productivity for on-line coding cannot be achieved with any of the above-mentioned coding techniques, an off-line coding system was recently introduced, e.g. as described in the U.S. Pat. No. 4,992,649. As disclosed, items with unidentified addresses are provided with an additional information such as a tracking identification (TID). The unidentified items are stored externally while the images of these items are presented to operators for coding Here, the operator is free from time limits normally associated with on-line coding. The items are subsequently presented to TID readers. The TID is like to the entered address information. Accordingly, a standard bar code sorting information can also be affixed to the item, so that the respective item can be processed in the same was as items that are normally OCR-read. Even though the off-line video coding method is an effective method for cording all address components, the further processing of items with addresses that have not been read requires additional capacities and a correspondingly complex logistic.

BRIEF SUMMARY OF THE INVENTION

It is the object of the present invention, to achieve the highest possible on-line coding letter items and the lowest possible rate of items where the address has not been read successfully. This and other objects are achieved by the present invention. The present invention permits an improved integration of automatic reading systems and video coding. The invention furthermore permits the effective use of an extraction coding in integrated, automatic and video coding systems, in particular it permits a simplification of the decision problem for the operator during the address coding. Another advantage of the method according to the invention is that additional sorting information can be evaluated effectively, e.g. information referring to the name line in the address. The invention has the added advantage of making it possible to deal effectively with inconsistencies, which can result, for example, from the extraction coding or from inscription errors made by the sender. The method also permits a simple integration of on-line and off-line coding, as well as the preview coding method.

BRIEF DESCRIPTION OF THE SEVERAL VIEWS OF THE DRAWINGS

The novel features and method steps believed characteristic of the invention are set out in the claims below. The invention itself, however, as well as other features and advantages thereof, are best understood by reference to the detailed description, which follows, when read in conjunction with the accompanying drawing, wherein:

DETAILED DESCRIPTION OF THE INVENTION

Figure 1:
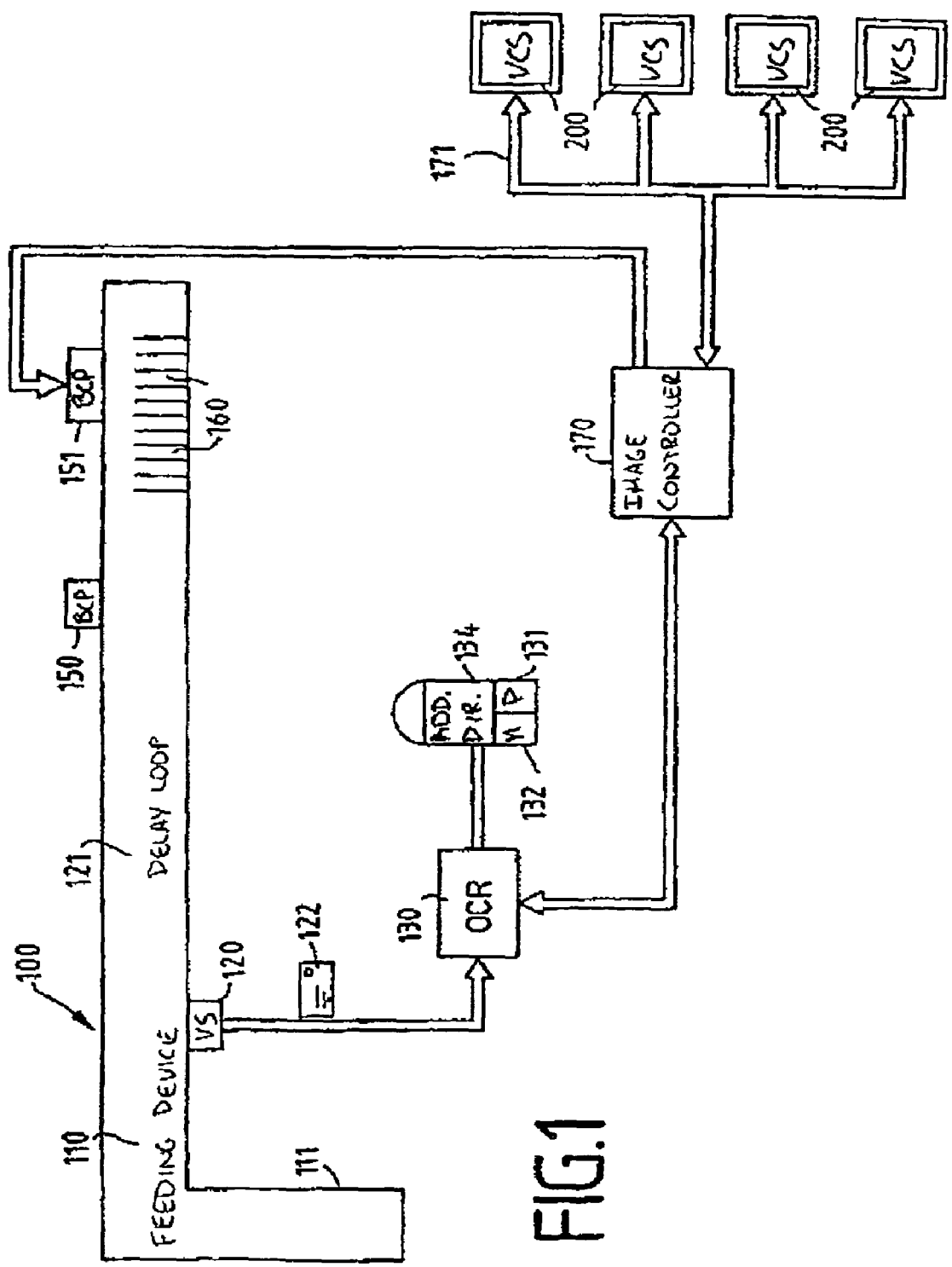
FIG. 1 depicts a schematic representation of a device for carrying out the method.

FIG. 1 shows a schematic representation of a letter distribution facility for implementing the method according to the invention. The OCR letter sort 100 comprises a feeding device 110, which pulls successive goods from a magazine 111 and transports these at approximately 10 goods per second to a high-resolution video scanner 120. Following this, the items are transported along a delay loop 121. The goods normally have address information on their surfaces. The OCR processor 130 is used for an evaluation the address information on the images for the goods, obtained with the video scanner 120. If the evaluation is completed, a bar code printer 150 is actuated and the item is provided with a corresponding bar code for the subsequent sorting into sorting compartments 160.

The OCR processor 130 comprises one or several microprocessors 131 with associated memory 132 for storing the images of the goods. The OCR processor furthermore comprises an address directory 134 with zip codes, city names and street names and possibly additional address-related information. During the evaluation of the images containing address information, a reduction, controlled by characteristics, of the entry obtained through the address directory occurs, such that a sort of partial directory is created. Reliability factors are associated during the individual entries, so that during the evaluation a number of data from correctly identified addresses are generated. The device furthermore contains an image controller 170, as well as a number of video coding stations 200, which are connected directly to the image controller 170 or via local area network (LAN) 171. If the OCR evaluation of an image is not or not completely successful, this image is transferred from the OCR processor 130 to the image controller 170, which controls on the one hand the TID bar code printer 151 and, on the other hand, sends the corresponding image to one of the video coding stations 200. The TID bar code printer 151 affixes an identification code TID to the corresponding item, which makes it possible to link the evaluated address information at a later time to a physical item. In that case, the images are preferably evaluated off-line, even though an on-line evaluation though video coding is basically possible, given a sufficiently long delay time. In the latter case, the TID can also be affixed to the goods at a later point in time, meaning if the video coding did not result in a complete evaluation within a predetermined, specific time interval.

In order to implement another method, the image controller 170 is designed such that address information, which is not completely (i.e. successfully) evaluated by the video coding, is supplied to another automatic address evaluation device, using the results from the video coding in the OCR processor.

Figure 2:
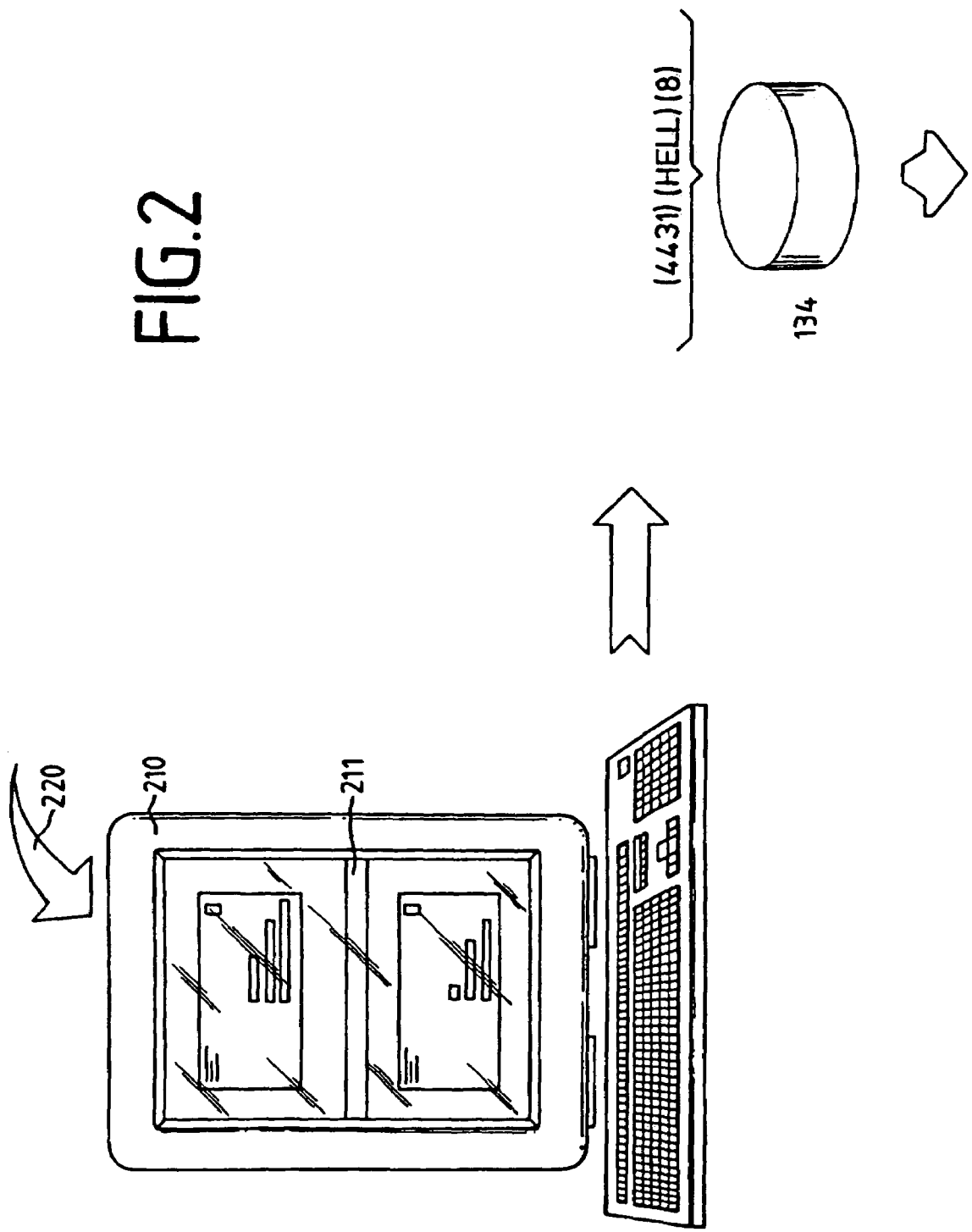
FIGS. 2 and 3 depict an overview of the data flow according to the invention.
Figure 3:
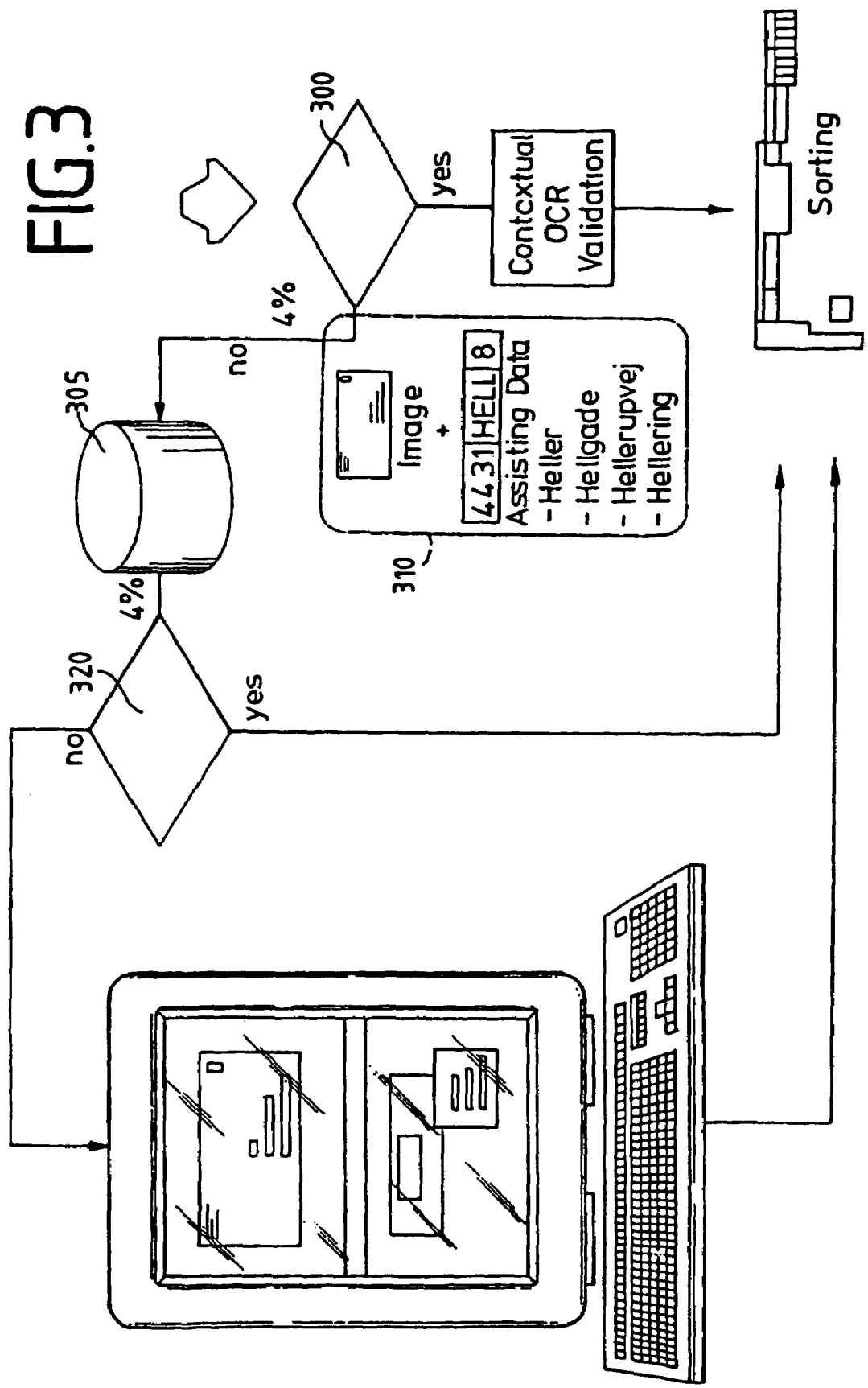

FIGS. 2 and 3 depict data-flow diagrams. The operators preferably work with divided displays 210. By way of application, the divided displays 210 may comprise an upper and a lower screen, wherein, for example, the upper screen permits previewing while the lower screen permits active coding. Data input by operator is shown in prompt line 211. Images of items that were not completely evaluated automatically are transmitted to the video coding 220. The example in FIG. 2 depicts the input of a zip code "4431," an extraction code for the street name "Hell," as well as the house number "8." Display forms other than divided display can be used as well. This input information is used to identify matching entries in the address directors 134. A complete evaluation of the address information of the respective image basically has occurred if a clear coordination between the input information and an entry in address directory 134 was found. However, such an unambiguous coordination cannot be achieved for a certain percentage of entries because a number of different address entries correspond to the coded address information.

According to FIG. 3, a decision 300 is made to decide whether the address information of an image was evaluated completely during the video coding. If the decision is positive (Yes), then the respective item can be provided either with a bar code if the delay time is sufficient to carry out an on-line video coding, or a corresponding linking takes place between the TID and a bar coding, based thereon. In any case, the respective item can be sorted further via standard means. In case of a negative decision (No), the invention provides for another automatic evaluation by using the results of the video coding, meaning that for this further automatic evaluation, the information obtained through video is available to the OCR processor in addition to the information shown on the image. In the above example, this is the triple information "4432," "Hell," "8." In FIG. 3, this is expressed symbolically by the content of circle 310. This is followed by a decision 320 on whether a complete evaluation of the respective image has taken place. In the positive case (Yes), the respective information is used for the further sorting of the item, in the same was as following a positive decision at decision point 300. If the decision is negative (No), another video coding takes place using the results of the additional automatic evaluation. In this case, the operator is preferably presented with a number of alternatives to be selected, from which a selection must be made.

It is preferable if the last two stages of the method, namely the additional automatic evaluation as well as the additional video coding, do not take place on-line, but off-line because the available delay time is too short for an on-line implementation.

The method according to the invention thus contains three phases that act in combination. These are:

1. The phase for data input through video coding, where a coding of certain parts of the address information takes place, preferably with a simple extraction code. During this process, the zip/postal code information as well as a larger portion of the additional address information is normally evaluated completely or the locality names are extracted if the zip/postal code is missing. A first automatic evaluation of the address information already preceded this phase. The input is preferably shown with a divided display. In order to simplify the input, a simple extraction code is used, e.g. a 4-digit postal code, the first four alpha characters of the street name and the digits for the house numbers of the respective addresses. With this extraction coding, an adaptation to the respective postal conventions is possible without problems. For example, the number of first letters can be varied. Preferably, the operator will input the postal code only if the OCR evaluation did not show any result at all. Thus, the input of street information will apply to most of the postal goods. A structuring of the video coding preferably can also occur in that one group of operators enters the postal code and street information while another group enters street information only. Since a specific percentage of the mail nowadays contains post office box information, a suitable key space on the keyboard should preferably be assigned as a post office box key, which can be depressed by the operator if necessary. Following this, the post office box number is entered. With company addresses, which lack street data or post office box data, it is also possible to enter the company line.

2. A second phase comprises a further automatic evaluation, using information that was entered during the previous phase with the aid of video coding. The additional information increases the probability of a complete evaluation takes place if the address information was not evaluated completely during the preceding phase. If an extraction code is used, two or more entries for the address exist in the address directory. With a suitable extraction cording, only two address entries exist for more than 90% of the cases.

3. A third phase comprises an additional video cording of those images which could not be evaluated completely during the previous phases. Images of the non-evaluated addresses are preferably presented to the operator, together with the result of the presiding video coding and the automatic evaluation of the second phase two. The operator must then preferably select only one option from the predetermined alternatives. Additional context information is subsequently available for further automatic evaluation. That is to say, the number of address entries to be considered is limited by the number of candidates obtained through the extraction coding. It can be assumed that the correct address is among these candidates. The house number is normally also known.

The further video coding of such address information, which was not evaluated completely during the presiding phases, is preferably used to process unclear results of the extraction coding or additional sorting-relevant information on the addressee line. The operator is preferably presented with successive images of the item surface, wherein the evaluation options of the address or the addressee are shown in one window. The options can be selected either through keyboard input of a selection number or via mouse or voice processor.

One preferred embodiment of the invention provides for an evaluation of a first component of the address information and an evaluation of a second component of the address information as well as a check of the evaluation results with respect to mutual consistency. The first component of the address information in particular can be the zip or postal code, the second component can be a street or a house number. Inconsistencies between both components may be due, for example, to reading errors or an incorrect listing of the zip or postal code. In case of a wrong information, a number of alternatives for the street name are obtained, starting with the first three or four digits of the zip or postal code. The operator performs an extraction coding of the second component of the address information, which also results in a number of suggestions for the street name. During the consistency check, only those suggestions are not rejected, for which the results of these two analyses are mutually compatible.

The aforementioned embodiment is explained in a further detail in the following with the aid of two examples. On one item, the address is listed as:

Bucklestr. 5

D-78457 Konstanz in place of the correct address:
Bücklestr. 5
D-78467 Konstanz

In that case, "78457 Buck 5" is used to obtain entry "Buckley 5, Konstanz" from a street directory during extraction coding. This is a correct association of the incorrect zip code 78457. During the consistency check, the inconsistency of "Bucklestr." and "Buckley" is detected through automatic evaluation and the respective evaluation result is rejected. On the other hand, if the address line with zip code and location information is read with a high error rate OCR, whereas the street information is read with a low error rate, the operator only enters the zip code or a number of letters from the location information. It is preferable in this case if the OCR result with low error rate is given preference over the operator input. In another preferred embodiment of the invention, the information affixed to the surfaces of items is evaluated through video coding in those cases where an automatic evaluation was not successful because the address information and the addressee information could not be differentiated by the automatic evaluation device. In particular, this occurs with mail items where the addressee information is affixed immediately above or below the address information, e.g. with mail from Denmark. Since the item surface is displayed for the operator during the video coding, it is normally easily possible to identify the respective information as address information or addressee information and, if necessary, to perform an extraction coding.

The invention being thus described, it will be obvious that the same may be varied in many ways. The variations are not to be regarded as a departure from the spirit and scope of the invention, and all such modifications as would be obvious to one skilled in the art are intended to be included within the scope of the following claims.

We claim:

1. A system for sorting items, said items comprising a surface having a destination address thereon, said system comprising:
   a. a scanner for producing an image of said destination address;
   b. an OCR processor associated with said scanner and art address directory, said processor comprising:
      means for receiving said image,
      means for decoding said entire destination address,
      means for determining if said decoding successfully arrived in a set of characters having a match in said address directory,
      means for receiving rule based characters and for limiting a plurality of database entries based upon said rule based characters,
      means for redecoding said entire destination address, and
      means for determining if said redecoding successfully arrived in a set of characters having a match in said address directory; and
   c. at least one video encoding station associated with said processor, said video encoding station comprising:
      means for generating data input and
      means for receiving operator input of said rule based characters, and
   d. an image controller associated with said video encoding station and said processor, said image controller comprising:
      means for directing said image from said processor to said station when said decoding is unsuccessful, and
      other means for directing said image and said data input from said station to said processor after operator entry of said rule based characters.

2. The system according to claim 1, further comprising another processor associated with said address directory, said another processor comprising means for creating a list of directory entries limited by said data input and means for transmitting said list to said OCR processor.

3. The system according to claim 2, wherein said directory is integral with said station.

4. The system according to claim 2, wherein said OCR is integral with said workstation.

5. The system according to claim 2, wherein said directory is integral to said OCR processor.

6. The system according to claim 5, wherein said controller further comprises means for directing said list to said station when no match is determined.

7. The system according to claim 6, wherein said station comprises means for receiving input from an encoder, said input comprising an indication of one of said list.

8. The system according to claim 1, further comprising a bar code printer associated with said controller, said printer printing a bar code on said item in response to a command from said controller.

9. The system according to claim 8, wherein said command is made by said controller in response to an unsuccessful decoding.

10. The system according to claim 9, further comprising a bar code reader located downstream from said bar code printer, said bar code reader facilitating retrieval of items stored based on bar codes printed thereon.

11. The system according to claim 1, further comprising a delay loop for delaying sorting of said items.

12. The system according to claim 1, wherein said delay loop is located upstream from said bar code printer.

13. The system according to claim 1, wherein said scanner is a high resolution scanner.

14. The system according to claim 1, wherein said item is a mail piece.

15. The system according to claim 1, wherein said item comprises one of a flat mail piece, a parcel and a form.

16. The system according to claim 1, further comprising:
   a. a track for transporting a plurality of items past said scanner;
   b. a feeding device for receiving said items and selectively directing said items to said track; and
   c. means for retrieving said items from a container and directing said items to said feeding device.

17. The system according to claim 16, wherein said container is a magazine.

18. The system according to claim 1, wherein said station comprises a monitor comprising means for displaying a plurality of images substantially simultaneously to an encoder.

19. The system according to claim 18, wherein said portion comprises initial letters of an address element manually entered into said station.

20. The system according to claim 1, further comprising means for using said OCR means to verify if a database entry is said destination address if said limited set comprises said database entry.

21. The system according to claim 1, further comprising means for requerying said database for a match of characters in said fixed number of keystrokes arid any characters unambiguously decoded in said step of decoding.

22. The system according to claim 1, wherein said OCR means comprises an OCR process in functional association with OCR software, a database, and a memory.

* * * * *